(12) United States Patent
Cylinder et al.

(10) Patent No.: US 7,665,688 B2
(45) Date of Patent: Feb. 23, 2010

(54) CONVERTIBLE AERIAL VEHICLE WITH CONTRA-ROTATING WING/ROTORS AND TWIN TILTING WING AND PROPELLER UNITS

(75) Inventors: David A Cylinder, New Egypt, NJ (US); James C Kellogg, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 563 days.

(21) Appl. No.: 11/691,971

(22) Filed: Mar. 27, 2007

(65) Prior Publication Data
US 2009/0014599 A1 Jan. 15, 2009

Related U.S. Application Data

(60) Provisional application No. 60/786,002, filed on Mar. 27, 2006.

(51) Int. Cl.
B64C 27/24 (2006.01)
B64C 27/28 (2006.01)
(52) U.S. Cl. ............... 244/7 A; 244/7 C; 244/56
(58) Field of Classification Search ........... 244/17.23, 244/17.25, 17.27, 12.4, 7 A, 7 C, 56, 66; 446/36, 37
See application file for complete search history.

(56) References Cited

U.S. PATENT DOCUMENTS

| | | | | |
|---|---|---|---|---|
| 2,423,625 A | * | 7/1947 | Smith | 244/7 R |
| 2,483,480 A | * | 10/1949 | Stalker | 244/17.23 |
| 3,035,789 A | * | 5/1962 | Young | 244/7 C |
| 3,179,352 A | * | 4/1965 | Nelson | 244/7 C |
| 3,506,219 A | * | 4/1970 | Mouille et al. | 244/17.21 |
| 3,884,431 A | * | 5/1975 | Burrell | 244/7 A |
| 4,093,155 A | * | 6/1978 | Kincaid, Jr. | 244/12.4 |
| 4,923,144 A | * | 5/1990 | Eickmann | 244/7 R |
| 4,925,131 A | * | 5/1990 | Eickmann | 244/7 C |
| D311,719 S | * | 10/1990 | Haga | D12/328 |
| 5,381,985 A | * | 1/1995 | Wechsler et al. | 244/7 C |
| 5,839,691 A | * | 11/1998 | Lariviere | 244/7 R |
| 6,227,481 B1 | * | 5/2001 | Fenny et al. | 244/7 R |

(Continued)

OTHER PUBLICATIONS

Green, W.E. and Oh, P.Y., "Autonomous Hovering of a Fixed-Wing Micro Air Vehicle", Proceedings of the 2006 IEEE International Conference on Robotics and Automation, May 2006, pp. 2164-2169.

(Continued)

*Primary Examiner*—Tien Dinh
*Assistant Examiner*—Joseph W Sanderson
(74) *Attorney, Agent, or Firm*—John J Karasek; Sally A Ferrett

(57) ABSTRACT

A micro aerial vehicle can be converted during flight between a fixed wing flight mode and a rotary wing flight mode. The canard design micro aerial vehicle includes a fuselage, two tiltable propellers and airfoils arranged at a forward portion of fuselage, a pair of coaxial drive shafts positioned aft of the tiltable propeller and airfoil arranged for contra-rotation, a stop rotor mechanism, and a pair of wing panels, each of the wing panels attached to one of the coaxial drive shafts. The wing panels act as contra-rotating rotor blades in the rotary wing flight mode, and act as fixed wing panels in the fixed wing mode.

20 Claims, 7 Drawing Sheets

U.S. PATENT DOCUMENTS

| | | | | |
|---|---|---|---|---|
| 6,367,736 | B1* | 4/2002 | Pancotti | 244/7 R |
| 6,607,161 | B1* | 8/2003 | Krysinski et al. | 244/7 A |
| 6,655,631 | B2* | 12/2003 | Austen-Brown | 244/12.4 |
| 6,659,394 | B1* | 12/2003 | Shenk | 244/7 C |
| 6,695,254 | B2* | 2/2004 | Zoppitelli et al. | 244/17.11 |
| 6,892,980 | B2* | 5/2005 | Kawai | 244/12.4 |
| 6,896,221 | B1* | 5/2005 | Einarsson | 244/7 C |
| 6,959,895 | B2 | 11/2005 | Cylinder et al. | |
| 6,974,105 | B2* | 12/2005 | Pham | 244/6 |
| 7,118,066 | B2* | 10/2006 | Allen | 244/7 B |
| 7,264,199 | B2* | 9/2007 | Zientek | 244/17.11 |
| 7,306,186 | B2* | 12/2007 | Kusic | 244/17.23 |
| 7,448,571 | B1* | 11/2008 | Carter et al. | 244/17.25 |
| 7,584,923 | B2* | 9/2009 | Burrage | 244/7 R |
| 2002/0100835 | A1* | 8/2002 | Kusic | 244/17.23 |
| 2005/0230519 | A1* | 10/2005 | Hurley | 244/7 C |

OTHER PUBLICATIONS

Mueller, T.J. and Delaurier, J.D., "Aerodynamics of Small Vehicles", Ann. Rev. Fluid Mech., vol. 35, pp. 89-111, 2003.

Kellogg, J.C. et al., Design and Development of the Samara Stop-Rotor Hybrid Micro Air Vehicle, 20th Bristol UAV Systems Conference—Apr. 2005, 10 pages.

Industry Shorts—Service: Small Wonder, [online], Aug. 25, 2004, [retrieved on Mar. 22, 2007], retrieved using Internet <http://www.roboticstrends.com/displayarticle475.html?POSTNUKESID=59d0554e026e80c213055708c54a716e>.

Dragonfly Canard—Rotor-Wing UAV, [online], Jul. 30, 1997, [retrieved on Mar. 22, 2007], retrieved using Internet <http://www.fas.org/irp/program/collect/crw.htm>.

Boeing X-50 Dragonfly, [online], [retrieved on Mar. 22, 2007], retrieved using Internet <http://avia.ltd.ee/helicopters_eng/boeing_x-50-r.html>.

Kellogg, J. et al., "Nonconventional Aerodynamics for Micro-UAVs", Proc. 16th International UAV Systems Conference, Bristol, UK, Apr. 2001, 10 pages.

Kellogg, J. et al., "The NRL MITE Air Vehicle", Proceedings of the Bristol RPV/AUV Systems Conference, 2001, 13 pages.

Kellogg, J. et al., "Development and Testing of Unconventional Micro Air Vehicle Configurations", Proc. of Unmanned/Unlimited Conference, AIAA, Sep. 2003, 10 pages.

* cited by examiner

| FLIGHT MODE | LIFT | FORWARD THRUST | PITCH | YAW | ROLL |
|---|---|---|---|---|---|
| HOVER | MAIN ROTOR AND TILT PROPELLERS COLLECTIVE THROTTLE | TILT PROPELLERS COLLECTIVE TILT | MAIN ROTOR AND TILT PROPELLER DIFFERENTIAL THROTTLE | TILT PROPELLERS DIFFERENTIAL TILT | TILT PROPELLERS DIFFERENTIAL THROTTLE |
| ROTARY WING FORWARD FLIGHT | MAIN ROTOR AND TILT PROPELLERS COLLECTIVE THROTTLE | TILT PROPELLERS COLLECTIVE TILT/ THROTTLE MIX | MAIN ROTOR AND TILT PROPELLER DIFFERENTIAL THROTTLE | TILT PROPELLERS DIFFERENTIAL TILT AND DIFFERENTIAL THROTTLE MIX | TILT PROPELLERS DIFFERENTIAL THROTTLE AND DIFFERENTIAL TILT MIX |
| FIXED WING FLIGHT | FIXED MAIN WING AND CANARD | TILT PROPELLERS COLLECTIVE THROTTLE | CANARD AND PROPELLERS COLLECTIVE TILT | TILT PROPELLERS DIFFERENTIAL THROTTLE AND REAR RUDDER | CANARD AND PROPELLERS DIFFERENTIAL TILT |

FIG. 4

CONVERTIBLE AERIAL VEHICLE WITH CONTRA-ROTATING WING/ROTORS AND TWIN TILTING WING AND PROPELLER UNITS

CROSS-REFERENCE TO RELATED APPLICATIONS

This Application is a non-provisional application of provisional (35 USC 119(e)) application 60/786,002 filed in the United States on Mar. 27, 2006, the entire disclosure of which in incorporated by reference herein.

BACKGROUND OF THE INVENTION

Uninhabited or unmanned aerial vehicles have been in use for several years for various purposes including carrying sensors, reconnaissance, and communications. Some unmanned vehicles are useful for flying into areas in which a manned aircraft would be at risk due to enemy fire, airborne contaminants, and other dangers.

In the mid 1990's, the Defense Advanced Research Project Agency (DARPA) began funding development of micro-air vehicles. Some examples of micro aerial vehicles are found in U.S. Pat. No. 6,959,989 to Cylinder, U.S. Pat. No. 6,626,398 to Cox et al., and in U.S. Pat. No. 6,082,671 to Michelson.

Examples of small propeller driven flying devices are found in "The NRL MITE Air Vehicle", Proceedings of the Bristol RPV/AUV Systems Conference, 2001, by Kellogg, J. et. al., the disclosure of which is incorporated herein by reference in its entirety.

Some other examples of small unmanned vehicles are disclosed in "Nonconventional Aerodynamics for Micro-UAVs", Proc. 16$^{th}$ International UAV Systems Conference, Bristol, UK, April 2001 by Kellogg, J. et al. and in "Development and Testing of Unconventional Micro Air Vehicle Configurations", Proc. of Unmanned/Unlimited Conference, AIAA, September 2003 by Kellogg, J. et al., each of which is incorporated herein by reference in its entirety.

Further description of micro-air vehicles, including several stop-rotor converting type micro-air vehicles, is found in "Design and Development of the Samara Stop-Rotor Hybrid Micro Air Vehicle", Proc. 20th International UAV Systems Conference, Bristol, UK, April 2005, by James C. Kellogg, Richard I. Foch, Aaron D. Kahn, Michael Baur, Donald Srull, David A. Cylinder, and George Piper.

BRIEF SUMMARY

An embodiment of the invention is directed to a micro aerial vehicle that can be converted during flight between a fixed wing flight mode and a rotary wing flight mode. The micro aerial vehicle includes a fuselage, two tiltable propellers and airfoils airfoil arranged at a forward portion of fuselage, a pair of coaxial drive shafts positioned aft of the tiltable propeller and airfoil arranged for contra-rotation, a stop rotor mechanism, and a pair of wing panels, each of the wing panels attached to one of the coaxial drive shafts. The wing panels act as contra-rotating rotor blades in the rotary wing flight mode, and act as fixed wing panels in the fixed wing mode.

An embodiment of the invention is directed to a micro aerial vehicle having a fixed wing flight mode and a rotary wing flight mode. The aerial vehicle includes a fuselage, two tiltable propellers and airfoils arranged at a forward portion of fuselage, a pair of wing panels, each of the wing panels attached to a drive mechanism and arranged to contra-rotate about a common axis, the wing panels being positioned aft of the tiltable propeller and airfoil and aft of the center of gravity of the vehicle.

BRIEF DESCRIPTION OF THE DRAWINGS

FIG. 4 is a table illustrating flight control functions in different flight modes for the exemplary micro aerial vehicle of FIG. 1-3.

DETAILED DESCRIPTION

The exemplary micro aerial vehicle 100 illustrated in FIG. 1-4 is capable of vertical takeoff and landing, hover, and low speed flight with agile maneuvering while operating as a rotary wing aircraft, and efficient high-speed flight when operating as a fixed wing aircraft. This capability allows the vehicle to operate in urban areas and other complex terrain, acting as a sensor platform while in flight. Further, it can land and act as a sensor when "perched" after landing in locations, such as rooftops, that might otherwise be inaccessible.

The vehicle 100 is arranged in a canard layout, with a wing/rotor system 120 in the central or aft section of the aircraft and a twin canard/propeller system 160 in the nose of the vehicle. As used herein, the term canard means that control surfaces for pitch, e.g., elevators, are located in the forward portion of the air vehicle, in front of the center of gravity. In conventional or non-canard air vehicles, the control surfaces for pitch are located in the rear portion of the air vehicle.

Figure 1A:
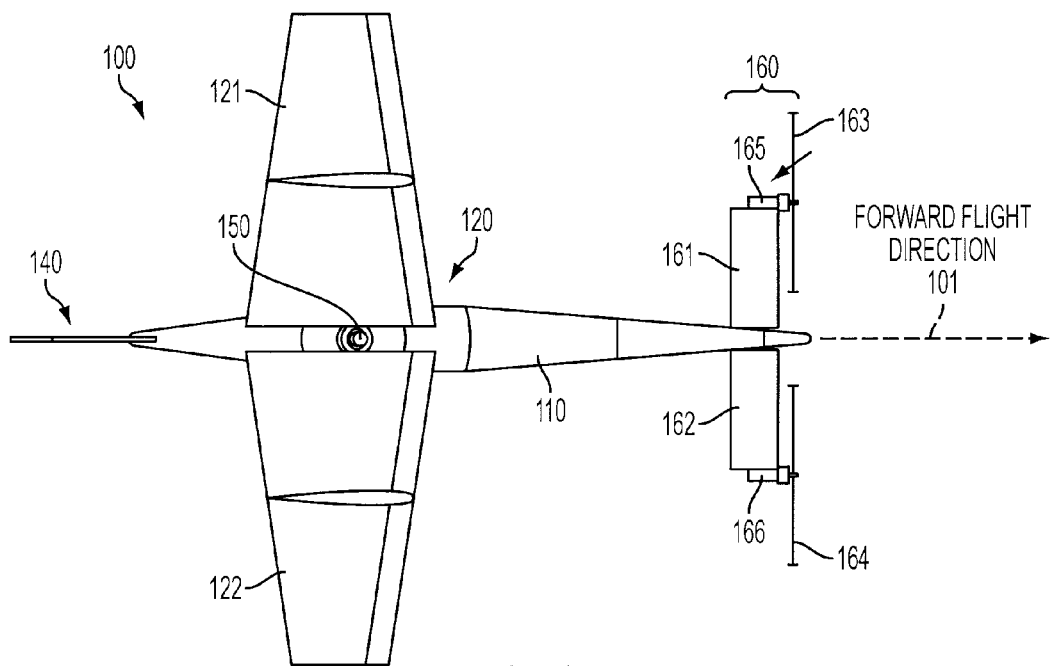
FIGS. 1A, 1B, and 1C illustrate an exemplary embodiment of an unmanned micro aerial vehicle 100 in a fixed wing forward flight configuration.
Figure 1B:
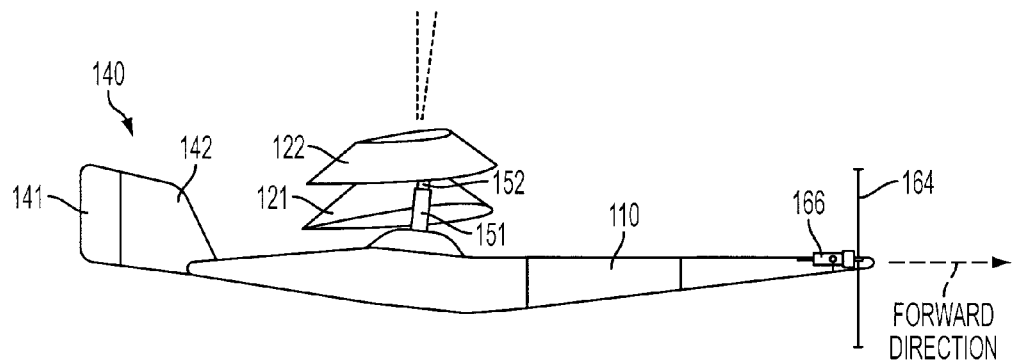
Figure 1C:
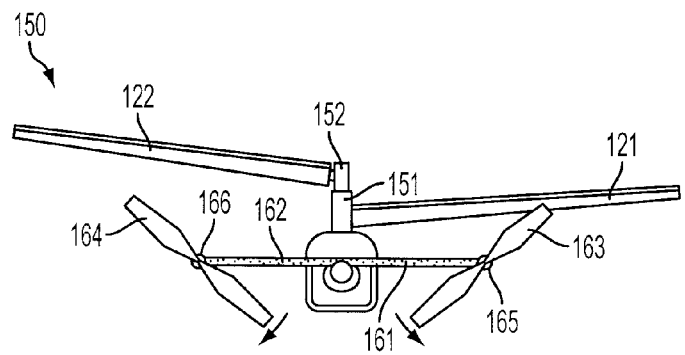

In fixed wing flight shown in FIGS. 1A, 1B, and 1C, the wing panels are locked into a fixed position. Thrust is provided by twin propellers 163 and 164. Additional lift is provided by the tiltable canard airfoil surfaces 161 and 162, with the amount of lift depending on their angle of attack.

Figure 2A:
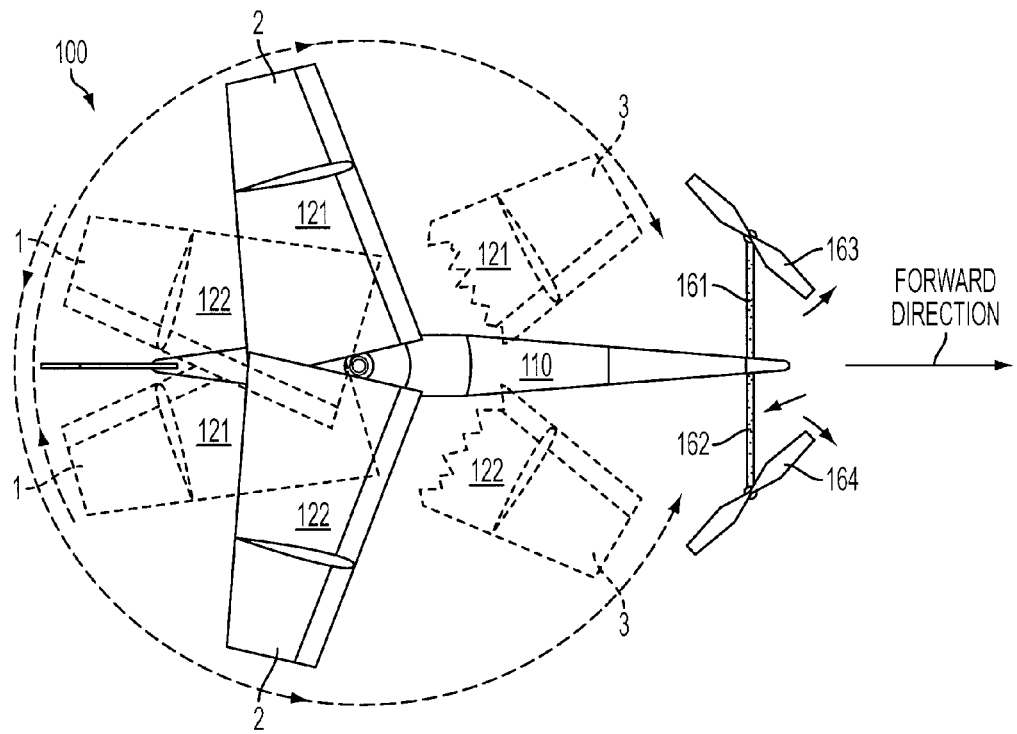
FIGS. 2A, 2B, and 2C illustrate the exemplary aerial vehicle in a rotary wing configuration.
Figure 2B:
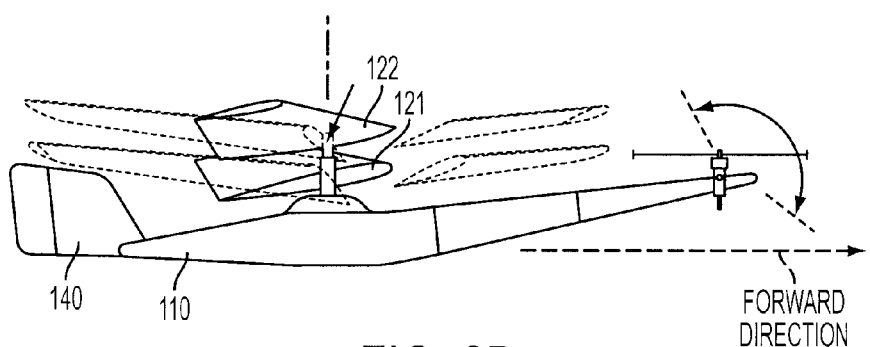
Figure 2C:
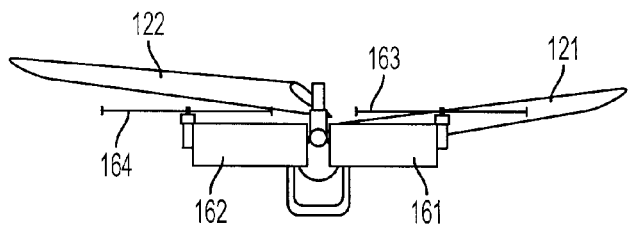

In rotary wing flight shown in FIGS. 2A, 2B, and 2C, the wing panels are unlocked and contra-rotate. The twin propellers 163 and 164 provide lift in a hovering mode and lift and thrust in forward flight mode.

The vehicle components and flight modes are described further as follows.

The canard/twin propeller system 160 is located near the forward end of the vehicle and includes controlled canard airfoil surfaces 161 and 162 that act as elevators to control the pitch of the vehicle 100. The airfoil surfaces are independently controlled so they can be at different angles from each other. The canard/twin propeller system 160 also includes two outboard propellers 163 and 164 located at the outer extremities of the airfoil surfaces. Motors 165 and 166 turn the propellers, respectively. The speed of each motor 165 and 166 can be independently adjusted to independently control the thrust for each propeller 163 and 164. The angle of each of the airfoils 161 and 162 can be independently adjusted to have the same or different canard angles. The wing units (airfoil/motor/propeller) on each side of the vehicle 100 are controllable differentially and collectively. For example, airfoil 161, motor 165, and propeller 163 move up and down together, so they are maintain at the same angle with respect to each other, so the propeller 163 draws the airflow over the airfoil at the same angle of attack regardless of the tilt angle. Similarly, airfoil 162, motor 166, and propeller 164 are kept at a same angle with respect to each other.

In an exemplary embodiment, and as seen in FIG. 2B, the canard tilt angles have a range of greater than ninety degrees, so as to be capable of operation below the horizontal, for nose-down thrust, and behind the vertical, for rearward or braking thrust. The airfoil/propellers have a range of at least five to ten degrees past the vertical and at least five to ten degrees past the horizontal.

The airfoils 161 and 162 act as a tilt canard wing to provide thrust at the angle required to maintain control, lift, and propulsion in all flight regimens (e.g., forward flight, vertical flight, and hover).

The vehicle 100 has a vertical stabilizer/rudder system 140 located aft of the rotor/wing system 120 and includes a vertical stabilizer 142 and a rudder 141.

The main wing/rotor system 120 is located at the central or aft part of the air vehicle and includes one pair of single-blade, rotary/fixed wing panels, each attached at its root to a coaxial shaft. As illustrated in FIGS. 1A, 1B, and 1C, wing panel 121 is attached to rotary shaft 151 and wing panel 122 is attached to rotary shaft 152. Rotary shafts 151 and 152 are coaxial. There is a slight vertical separation between the panels 121 and 122. The vertical separation between the panels should be sufficient to prevent the wing panels from contacting each other during operation.

The wing panels and shafts are arranged to have both a fixed wing configuration and a rotary wing configuration. Rotary wing mode is used for vertical takeoff and landing, hover, and agile low-speed flight.

In rotary wing mode, the shafts 151 and 152 rotate in opposite directions, so the wings rotate in opposite directions. As illustrated in FIG. 2A, during rotary wing operation, shaft 151 and wing 121 rotate in a clockwise direction, and shaft 152 and wing panel 122 rotate in a counterclockwise direction. In rotary wing mode the contra-rotating panels 121 and 122 are mechanically linked to turn at the same speed and to maintain their relative rotational phasing. The two panels 121 and 122 always maintain mirror-image positions across the centerline 101 of the aircraft. The contra-rotation of the panels eliminates the need for an anti-torque mechanism often used in conventional rotary air vehicles.

In FIG. 2A, three rotary positions of the wing panels 121 and 122 are shown. In position 1, the wing panels cross over each other at the end of the retreating blade phase. In position 2, the wing panes are in the advancing blade phase. In position 3, the wing panels complete the advancing blade phase before crossing each other to begin the retreating blade phase.

In an exemplary embodiment, the wing panels 121 and 122 are lightweight, with a low moment of inertia, making it possible to start and stop wing rotation rapidly. The light weight also minimizes any fore and aft vibration caused by an oscillatory shift in weight as the panels 121 and 122 contra rotate.

Fixed wing mode is used for efficient high-speed flight over long ranges. For fixed wing flight, the wing panels 121 and 122 are locked in place opposite each other, forming a conventional fixed wing except for their slight vertical displacement.

In a hover mode, the tilt canard/propeller system is positioned vertically as shown in FIGS. 2A, 2B, and 2C. The propellers 164 and 165 provide thrust in an upward direction necessary to prevent the aircraft from pitching nose downward. The vertical lift of the tilt propellers 163 and 164 also relieves the main rotor from lifting the entire aircraft weight. This allows the main rotor to be sized smaller than would be necessary to lift the entire aircraft, and also allows the center of gravity position to coincide with that of the fixed-wing configuration.

Note that the term horizontal as used herein means that the blades of the propellers 163 and 164 are within a few degrees of horizontal, and the axis of rotation of the propellers is within a few degrees of vertical. The corresponding canard airfoils 162 and 161 are positioned with their leading edges pointing upward, as seen in the end view of FIG. 2C. Similarly, when the canard airfoil/propeller unit is described as being positioned vertically, the term "vertically" means that the blades of the propellers are within a few degrees of vertical and the axis of rotation of the propellers is within a few degrees of horizontal.

To transition the air vehicle 100 from hover (FIGS. 2A, 2B, and 2C) into forward rotary-wing flight, the canard/propeller system 160 is gradually tilted from the vertical position of FIG. 2A, 2B, and 2C forward into the horizontal position of FIGS. 1A, 1B, and 1C. While being tilted forward, the propellers 163 and 164 provide forward thrust as well as vertical thrust. As forward airspeed increases, the pitch-up moment of the rotor system 120 is countered by a reduction of the lift component of the tilt propellers 163 and 164 brought about by lowering their angle, reducing propeller speed, or both, so as to maintain longitudinal stability. The canard airfoil surfaces 161 and 162 will also gain airspeed and begin to create lift, allowing a further lowering of their angle toward a horizontal position.

Once the airspeed exceeds the fixed-wing configuration stall speed, conversion can be made to fixed wing flight by stopping rotation of the rotor shaft 150, with the wing panels 121 and 122 in their fixed-wing position shown in FIG. 1A. The canard airfoil surfaces 161 and 162 are now in or near the horizontal position, with the propellers positioned to provide forward thrust. The air vehicle 100 continues in flight as a fixed wing aircraft, with the inherent speed and efficiency advantages of a fixed wing aircraft.

To convert from fixed-wing to rotary wing flight, the rotor/wing system is unlocked to allow the rotors to rotate, and the main motor is engaged to turn the rotor shaft 150. The canard airfoil surfaces 161 and 162 are tilted upward.

The angles of the left and right canard surfaces and their tip propellers can be changed differentially and collectively, and the speed of the twin propellers can be varied differentially and collectively, to provide variable lift, thrust, and full three-axis control in hover, rotary wing flight, and fixed wing flight.

As seen in FIG. 2B, the contra-rotating coaxial shafts 151 and 151 to which the wing/rotor panels attach are aligned vertically during rotary wing flight. In this mode, the panels require a higher aerodynamic angle of attack than when acting as a fixed wing. For example, the wing panels have a preferable angle of attack of about ten degrees when in rotary wing flight mode, and a preferably angle of attack of about two degrees when in a fixed wing flight mode. Upon conversion to fixed wing flight, the vehicle 100 tilts slightly nose-downward, tilting the coaxial shafts slightly forward and thereby reducing the angle of attack of the fixed wing to the desired value. The change in vehicle pitch and rotor shaft angle with the vertical can be seen by comparing FIGS. 1B and 2B. This eliminates any need for a mechanical mechanism to alter the wing/rotor pitch, as has been used on other stop-rotor aircraft. The fuselage is aligned so as to minimize drag when the MAV achieves high speed in fixed wing flight.

Figure 3:
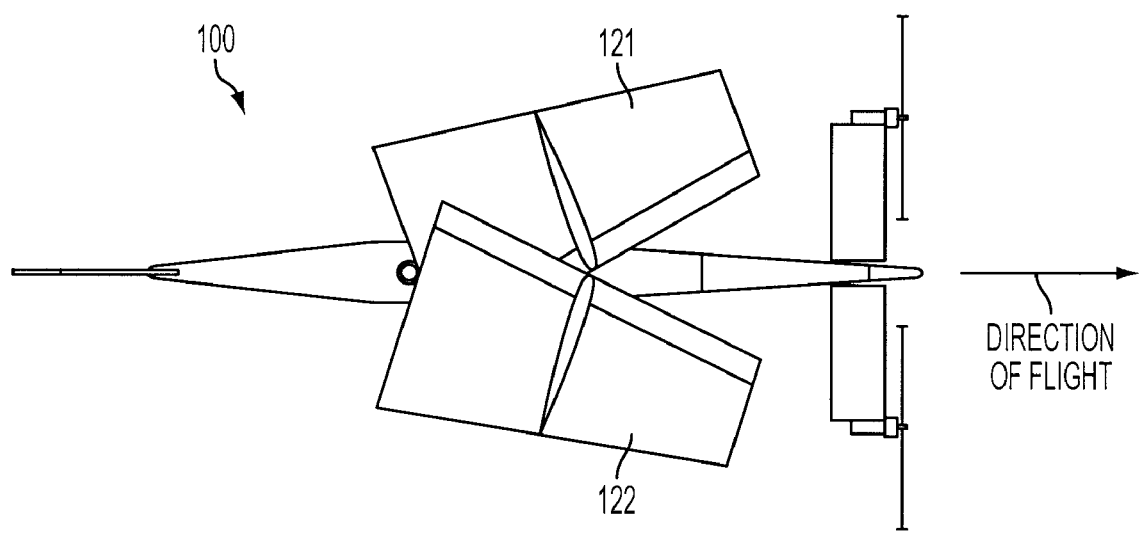
FIG. 3 illustrates the exemplary aerial vehicle at rest.

FIG. 3 illustrates the air vehicle 100 in an at-rest configuration. When at rest on the ground or other surface, the vehicle wing/rotor panels 121 and 122 can be are rotated back over the rear of the vehicle, minimizing wind disturbance to the vehicle when perched.

FIG. 4 is a table summarizing the flight control functions in different flight modes for the exemplary micro aerial vehicle of FIG. 1-3.

Figure 5:
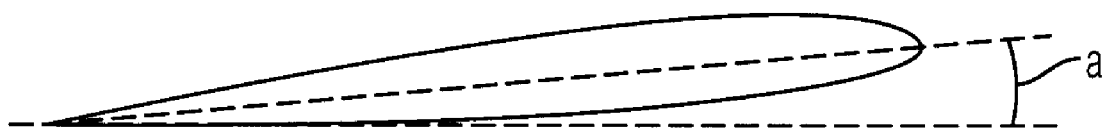
FIG. 5 is an example of a suitable cross section for the wing rotor and the canard airfoil in a micro air vehicle.

The canard airfoils and the wing panels preferably have a low Reynolds number airfoil shape with a leading and trailing edge. An example of a suitable airfoil cross section is illustrated in FIG. 5. As discussed in previous paragraphs, the angle of attack "a" of the wing panels can be changed during flight simply by pitching the air vehicle slightly nose up or nose down, without any need for additional mechanisms to change the profile of the wing panels.

Figure 6:
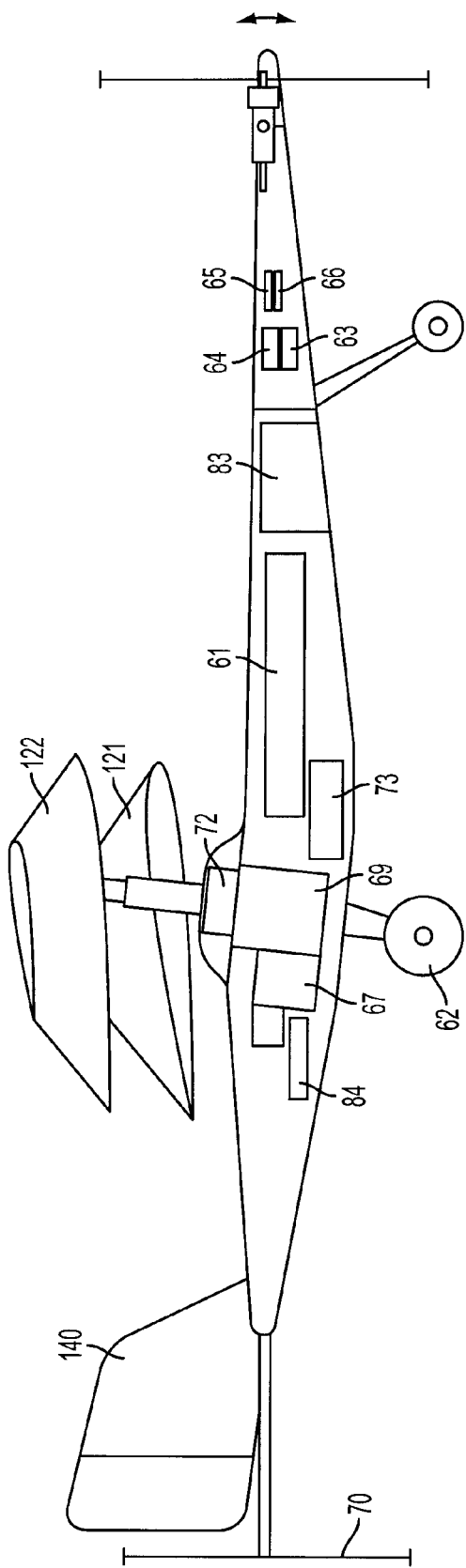
FIG. 6 is a schematic illustration of the control and internal fuselage components of the micro air vehicle in accordance with an embodiment of the invention.

FIG. 6 illustrates schematically the control and other components of the micro air vehicle in accordance with an embodiment of the invention. An energy storage battery 61 provides electrical power to the twin motors 165, 166, and to the main power plant/motor 67. A main power plant transmission 69 turns the coaxial rotor shafts 151 and 152. Wheels 62 are provided on the underside of the fuselage 110. Control actuators 63, 64, 65, and 66 control the tilt angle of the left and right canard airfoils/propellers.

Two identical, but independently controllable, motors 165 and 166 operate the twin tilt propellers 163 and 164, respectively. These propellers counter rotate to eliminate torque reaction.

The main rotor shaft 150 is turned by a single, larger motor and transmission 69 that contra-rotates the coaxial shafts 151 and 152 of the rotor head and maintains the wing panels' relative rotational phasing. During fixed wing flight this motor 69 can be shut down, or it can drive an optional pusher propeller 70 via a clutch for additional forward thrust. The rotor transmission 69 includes a locking mechanism 72, e.g., a stop-rotor mechanism, to hold the wing panels in a fixed position opposite each other while in fixed-wing mode.

The pitch of the vehicle 100 can optionally be controlled using sensors, microcontrollers, and a pitch-trim control loop within the flight control system 73. The pitch trim control loop and microcontrollers rotate the angle of the canard airfoils and propellers to provide more or less lift to the nose of the vehicle to offset the rotor pitching moment. These vehicle control sensors 81, 82 used for vehicle control can include air speed sensors, gyroscopes, and angle of attack sensors.

Although no vibration damping mounts are included for the main motor or transmission in the air vehicle 100, optionally, such mounts can be included if desired to steady the vehicle during flight.

The center of gravity of the aircraft is located forward of the rotor/wing system 120 and aft of the canard airfoil surfaces 161 and 162. Preferably, the location of the center of gravity should be located based on the relative lift of the main rotor and wings and the lift of the forward twin propellers in rotary flight and the lift of the canard airfoil surfaces and the fixed wing when in fixed wing flight.

The electrically powered FIG. 1 micro aerial vehicle very quiet in operation and has a very low infrared signature, making it unobtrusive and difficult to detect. Missions for such a vehicle can include: military reconnaissance, law enforcement, surveillance, intelligence gathering, hazardous area inspections, video and photojournalism, environmental monitoring. Embodiments of the invention are also available for use as flying model aircraft.

The air vehicle 100 has better stability and control than the Samara MAV described in "Development and Testing of Unconventional Micro Air Vehicle Configurations", Proc. of Unmanned/Unlimited Conference, AIAA, September 2003 by Kellogg et al. The air vehicle 100 can hover and maneuver with agility at low speed like a helicopter, and fly efficiently at high speed like an airplane, with a level of mechanical complexity that is less than a helicopter's. The vehicle 100 has a combination of the contra rotating wing/rotor system and the tilting canard allow the wing panels' angle of attack to be changed for the MAV's different flight modes simply by pitching the aircraft slightly up or down without any additional mechanism.

Although the exemplary micro aerial vehicle 100 described herein is driven with electric motors, other power sources are also suitable, including reciprocating or turbine engines. Power for the electric motor can be provided by electrical batteries. The vehicle 100 can be remotely controlled by a ground operator or autonomously by a suitable automatic pilot, and can include radio receivers and or transmitter units for remote control. The vehicle 100 can include automatic systems to provide or augment stabilization, such as a controller for pitch based on airspeed and other measurements.

The vehicle 100 can be constructed of any structural materials appropriate for small, lightweight aircraft. Examples of suitable materials include fiberglass, carbon or carbon-graphite-epoxy composites, wood, and plastics.

In the exemplary embodiment shown herein, the propellers 164 and 166 are counter-rotating single blade propellers, however air vehicles according to embodiments of the invention can include propellers with additional blades.

The canard airfoils and the wing panels preferably have a low Reynolds number airfoil shape with a leading and trailing edge. An example of a suitable airfoil cross section is illustrated in FIG. 5. As discussed in previous paragraphs, the angle of attack "a" of the wing panels can be changed during flight simply by pitching the air vehicle slightly nose up or nose down, without any need for additional mechanisms to change the profile of the wing panels.

The micro aerial vehicle 100 shown in FIG. 1-3 can have a wing/rotor span of 71 cm, a wing area of 1050 square centimeters, and weighs approximately 450 grams. The micro aerial vehicle 100 can be larger or smaller, and, for example, can have a wing span of about 36 inches, or greater.

The vehicle 100 can include one or more monitoring sensors 83, including but not limited to visible or infrared cameras, video cameras, microphones, and chemical sensors. The vehicle 100 can operate as an airborne sensor platform in confined spaces such as urban areas or inside buildings. Optionally, the vehicle can also include communications devices for transmitting sensor outputs or other communications to a controller, relay, or base station. The vehicle is capable of landing in small spaces that might otherwise be inaccessible, and perch there as a remote sensor post. Possible missions for such a vehicle include but are not limited to: military reconnaissance; law enforcement surveillance; intelligence gathering; hazardous area inspections; video and photojournalism; and environmental monitoring.

Figure 7:
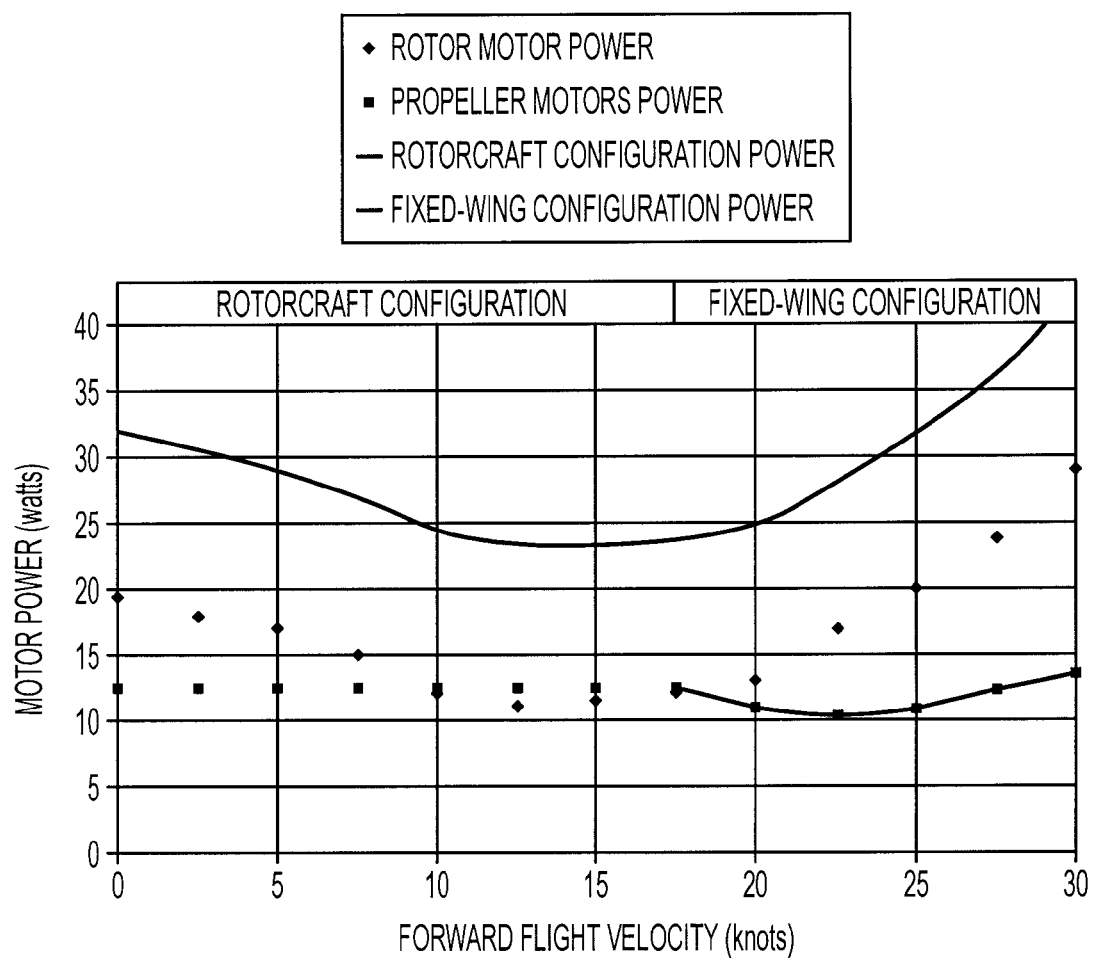
FIG. 7 illustrates the motor power and total motor power in rotary and fixed wing modes.

FIG. 7 illustrates the power of the hover rotor motor transitioning into the forward flight fixed-wing mode. The hover power of the rotor is approximately 31 watts, with the rotor motor using 65% of the total power. At the fixed wing stall speed of approximately 18 knots the rotor power has reduced to approximately 24 watts, with the rotor motor using 46% of the total power. Once the rotor motor is stopped into the fixed wing configuration the propeller motor uses only 12 watts, which is 40% of the total rotorcraft hover power.

The aerial vehicle 100 has several advantages over "Samara I", an earlier micro air vehicle with a dual single-blade, contra-rotating wing/rotor system, as discussed in Design and Development of the Samara Stop-Rotor Hybrid Micro Air Vehicle", Proc. 20th International UAV Systems Conference, Bristol, UK, April 2005, by James C. Kellogg et al. The Samara I MAV used conventional aft tail surfaces, with elevator and rudder, for pitch and yaw control. It had no direct roll control or rotor collective and/or cyclic pitch control. During forward flight in rotary wing mode, the Samara MAV could exhibit an unstable pitching motion. The upward pitching increased rapidly with airspeed, requiring more authority in pitch than an elevator alone could provide, making it difficult or impossible to maintain stability. In addition, the Samara I MAV's forward wing-aft tail layout required different center of gravity positions for hover, forward flight in rotary wing mode, and flight in fixed wing mode, a change that could only be made manually with the vehicle on the ground.

Other stop-rotor converting aircraft without the Samara contra-rotating rotor-wing system use a wing assembly that rotates on the aircraft centerline as a conventional (single rotation direction) two-bladed rotary wing. The airflow over one of the wing/rotor panels must reverse direction when the rotor is stopped in flight for conversion to fixed wing mode. Also, the pitch of at least one of these panels must be changed to meet the airflow correctly when they are switched between rotary and fixed wing duty. This function requires a complex mechanism. It also required the wing/rotor panels to use an airfoil that is symmetrical across the chord rather than having a preferred leading or trailing edge. Such airfoils are inefficient in comparison to single flow direction airfoils, both for fixed and rotary wings.

The vehicle 100 described herein has other advantages over traditional helicopter designs. Note that the blades of the vehicle 100 in phase-advance and retreat in phase with each other. As a result, the asymmetries caused by advancing and retreating wing panels are cancelled out. In contrast, in traditional helicopters, the rotor blades advance and retreat out of phase with each other, so the advancing rotor blade will experience greater relative airspeed than the retreating blade, thus generating more lift. At greater airspeeds, helicopters experience a more asymmetric lift distribution about the roll axis. The resulting roll moment can gyroscopically couple into the pitch axis through the rotor's angular momentum, causing the traditional helicopter to experience a pitching motion that is airspeed dependent.

The invention has been described with reference to certain preferred embodiments thereof. It will be understood, however, that the invention is not limited to the preferred embodiments discussed above, and that modification and variations are possible within the scope of the appended claims.

What is claimed as new and desired to be protected by Letters Patent of the United States is:

1. A convertible aerial vehicle having a fixed wing flight mode and a rotary wing flight mode, the aerial vehicle comprising:
    a fuselage;
    two propellers and airfoils tiltably arranged at a forward portion of fuselage;
    a pair of coaxial drive shafts positioned aft of the tiltable propeller and airfoil arranged for contra-rotation; and
    a pair of wing panels, each of the wing panels attached to one of the coaxial drive shafts, the wing panels adapted to rotate in opposite directions in rotary flight mode and to lock in a fixed wing mode position in fixed wing flight mode.

2. The aerial vehicle of claim 1, wherein each tiltable propeller is located outboard of the corresponding airfoil.

3. The aerial vehicle of claim 1, further comprising two motors, each motor driving one of the tiltable propellers.

4. The aerial vehicle of claim 1, wherein each airfoil and tiltable propeller has a range of more than 90 degrees.

5. The aerial vehicle of claim 1, further comprising:
    an electric motor arranged to drive the coaxial rotor shafts.

6. The aerial vehicle of claim 5, further comprising:
    a battery connected to the electric motor.

7. The aerial vehicle of claim 1, wherein the wing panels are vertically offset from each other.

8. The aerial vehicle of claim 1, wherein the two wing panels have a larger surface area than the airfoils.

9. The aerial vehicle of claim 1, wherein the center of gravity of the vehicle is located between the coaxial drive shafts and the airfoils.

10. The aerial vehicle of claim 1, wherein the coaxial drive shafts are stopped from rotating for fixed wing flight.

11. The aerial vehicle of claim 1, further comprising a locking mechanism to fix the rotor-shafts in position during fixed wing flight.

12. The aerial vehicle of claim 1, further comprising:
    a vertical stabilizer and rudder located aft of the coaxial drive shafts.

13. The aerial vehicle of claim 12, further comprising a push propeller arranged aft of the vertical stabilizer and rudder.

14. The aerial vehicle of claim 1, wherein each wing panel has a leading edge and a trailing edge with a different profile than the leading edge.

15. The aerial vehicle of claim 1, wherein the wing span is less than one meter.

16. The aerial vehicle of claim 1, wherein the aerial vehicle has a canard configuration.

17. The aerial vehicle of claim 1, wherein the wing panels have an equal angle of attack when contra-rotating about the axis of the rotor shafts in rotary mode.

18. The aerial vehicle of claim 17, wherein changing the angle of attack is accomplished by changing the pitch of the vehicle.

19. An aerial vehicle having a fixed wing flight mode and a rotary wing flight mode comprising:
    a fuselage;
    two propellers and airfoils tiltably arranged at a forward portion of fuselage;
    a pair of wing panels positioned aft of the tiltable propellers and airfoils and aft of a center of gravity of the vehicle;
    a drive mechanism adapted to rotate the wing panels in opposite directions in rotary flight mode and to lock the wing panels in a fixed wing mode position in fixed wing flight mode.

20. The aerial vehicle of claim 19, wherein the two wing panels have a larger surface area than the airfoils.

* * * * *